(12) United States Patent
Kasahara

(10) Patent No.: US 6,546,201 B2
(45) Date of Patent: Apr. 8, 2003

(54) FINDER DRIVE MECHANISM AND CAMERA

(75) Inventor: Hideyuki Kasahara, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/933,327

(22) Filed: Aug. 20, 2001

(65) Prior Publication Data

US 2002/0025150 A1 Feb. 28, 2002

(30) Foreign Application Priority Data

Aug. 22, 2000 (JP) ........................................ 2000-251402

(51) Int. Cl.$^7$ ................................ G03B 17/00; G03B 13/10
(52) U.S. Cl. .................................................. 396/84; 396/379
(58) Field of Search ........................... 396/83, 84, 378, 396/379

(56) References Cited

U.S. PATENT DOCUMENTS 5,734,931 A * 3/1998 Inoue et al. .................. 396/52
6,185,375 B1   2/2001 Mikami

FOREIGN PATENT DOCUMENTS

JP          11-212144 A       8/1999

* cited by examiner

Primary Examiner—Russell Adams
Assistant Examiner—Arthur A Smith
(74) Attorney, Agent, or Firm—Frishauf, Holtz, Goodman & Chick, P.C.

(57) ABSTRACT

In a camera to which the finder drive mechanism of the invention is applied, a lens barrel is driven by a drive motor through a zoom drive gear train and a lens frame drive gear train, and the finder variable power of a finder optical system is moved forward and backward in association with the lens barrel through the zoom drive gear train, finder drive gear train, a friction clutch mechanism and a finder cam mechanism. The finder cam assembly of the finder cam mechanism rotates an angle of a predetermined operation range of at least one rotation, thereby moving forward and backward the zoom finder lens system. According to the camera having the finder drive mechanism, a finder optical system having high variable power can be assembled thereto, and moreover the finder optical system can be moved forward and backward with a pinpoint accuracy by the finder drive mechanism.

13 Claims, 8 Drawing Sheets

FINDER DRIVE MECHANISM AND CAMERA

This application claims the benefit of Japanese Application No. 2000-251402 filed in Japan on Aug. 22, 2000, the contents of which are incorporated herein by reference.

BACKGROUND OF THE INVENTION

1. Field of the Invention

The present invention relates to a camera containing a finder mechanism that is driven forward and backward.

2. Description of the Related Art

Hitherto, Japanese Unexamined Patent Application Publication No. 11-212144 proposes a finder drive mechanism for a camera. This finder drive mechanism is arranged such that a lens frame is coupled with a finder cam through a gear and a finder optical system is driven forward and backward in association with the forward and backward rotation of the lens frame, and a phase adjusting friction clutch transmission mechanism is applied to the gear coupling unit thereof to adjust a phase.

It is possible to automatically execute phase alignment between a zoom lens barrel acting as a photographing lens barrel and a finder by utilizing the above-mentioned phase adjusting friction clutch transmission mechanism. Thus, it is not necessary to pay particular attention to the offset of an adjusted zoom position in assembly, which results in an effect of reducing man-hours in assembly and adjustment.

In the finder drive mechanism disclosed in Japanese Unexamined Patent Application Publication No. 11-212144, a finder cam is driven by a drive motor in association with the zoom lens barrel through a zoom drive gear mechanism, a finder drive gear mechanism, and a friction clutch mechanism so as to drive the finder optical system forward and backward. Since the finder cam requires a stopper that is abutted against a wide angle end and a telephoto end, the rotation angle of the finder cam is smaller than one rotation angle. Therefore, the variable power of a finder and a diopter scale are too sensitive to the rotation angle of the finder cam, which is disadvantageous to the accuracy of the camera including parts. Further, an increase in a zoom ratio increases the pressure angle of the finder cam, which is disadvantage in the amount of driving force.

SUMMARY OF THE INVENTION

In view of the aforementioned problems, an object of the present invention is to provide a finder drive mechanism to which a finder optical system having high variable power can be assembled and which can move forward and backward with a pinpoint accuracy, and to provide a camera containing the finder drive mechanism.

A finder drive mechanism of the present invention includes a finder cam assembly which has a rotating shaft and to which a cam is formed so as to drive a lens group in a finder optical system by rotation thereof; a rotation regulating member disposed around the rotating shaft of the finder cam assembly so as to be free to rotate in both directions; a rotation locking member disposed in a locus of rotation of the rotation regulating member for regulating a rotating range of the rotation regulating member to less than one rotation by being abutted against and locking the rotation regulating member; and an abutment section formed to the finder cam assembly and capable of being abutted against the rotation regulating member in a rotating direction thereof. In this finder drive mechanism, the finder cam assembly is operated in one of the following operating states according to the rotation thereof in both directions: an independently-rotating-state in which the abutment section is separated from the rotation regulating member and the finder cam assembly rotates independently; an integrally-engaged-rotating-state in which the abutment section is abutted against the rotation regulating member and rotates the rotation regulating member integrally with the finder cam assembly; and a locking state in which the rotation of the finder cam assembly is locked by locking the rotation of the rotation regulating member that is rotated in the integrally-engaged-rotating-state by the rotation locking member.

A camera of the present invention includes a variable power photographing lens barrel having a variable power photographing optical system; a drive source; a first driving force transmission means for transmitting a driving force from the drive source to the variable power photographing lens barrel; a finder optical system having a variable power function according to the variable power photographing optical system; a finder cam assembly having a rotational operation range of at least one rotation about a rotating shaft for driving a variable power lens group of the finder optical system by being rotated; a second driving force transmission means for transmitting the driving force from the drive source to the finder cam assembly of the finder optical system; a friction clutch means disposed to the second driving force transmission means; and a stopper means for regulating the rotational operation range of the finder cam assembly to a predetermined operation range of at least one rotation. In the above camera, the driving force from the drive source is transmitted to the finder cam assembly by the second driving force transmission means, and the rotating operation range of the finder cam assembly is regulated to a predetermined operation range of at least one rotation.

Further objects, features and advantages of the present invention will become apparent from the following description.

DESCRIPTION OF THE PREFERRED EMBODIMENTS

An embodiment of the present invention will be described below with reference to the drawings.

Figure 1:
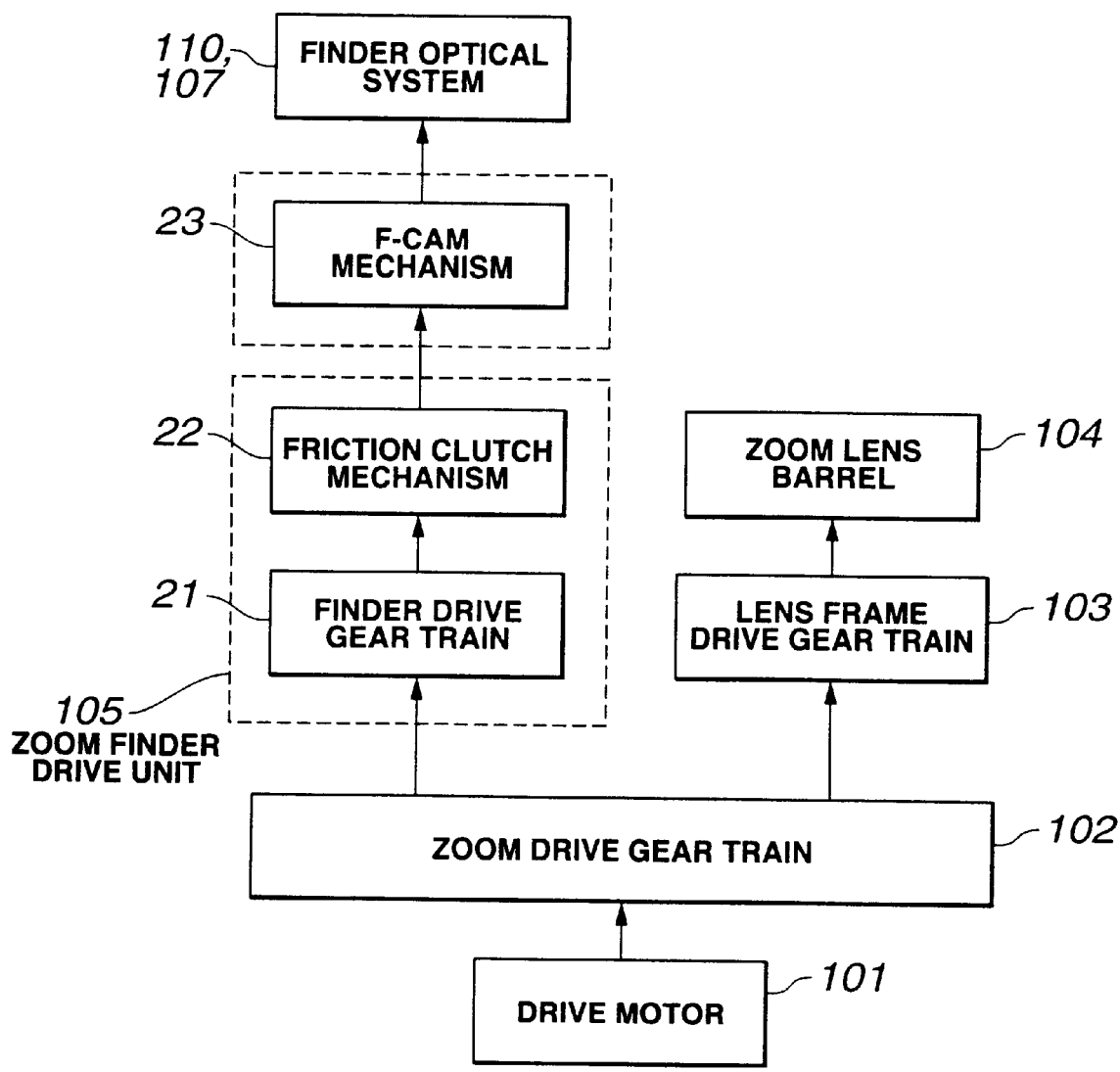
FIG. 1 is a block diagram showing the arrangement of a camera of an embodiment of the present invention containing a finder drive mechanism.
Figure 2:
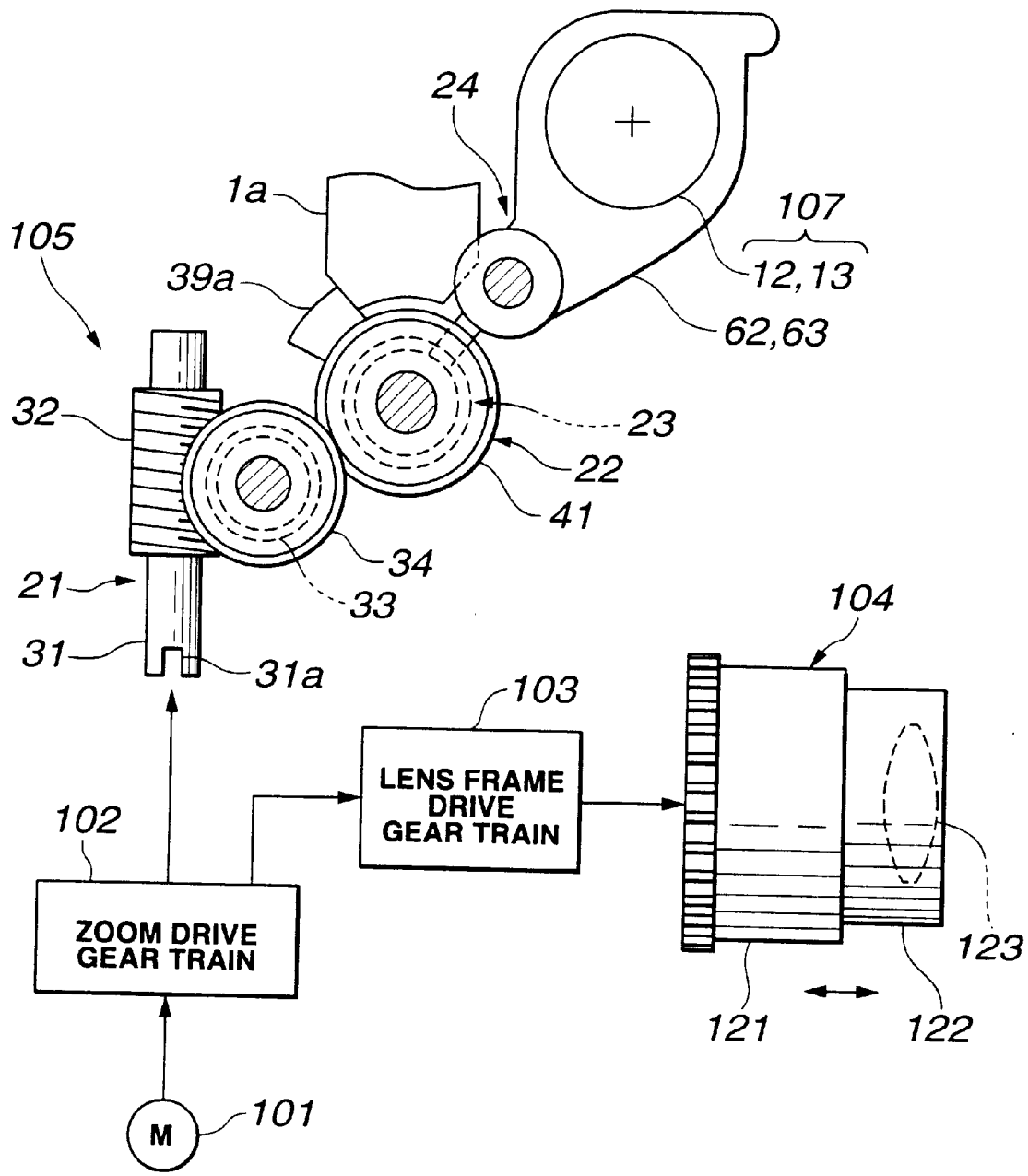
FIG. 2 is a block diagram schematically showing the arrangement of a lens barrel unit and a finder unit of the camera of the embodiment of FIG. 1.

FIG. 1 is a block diagram showing the outline of a camera of an embodiment of the present invention having a finder drive mechanism built-in, and FIG. 2 is a block diagram schematically showing the arrangement of a lens barrel unit and a finder unit of the camera.

The camera includes, as a photographing and finder optical system and its drive unit, a variable power photographing lens barrel (zoom lens barrel) 104, a finder optical system 110, a drive motor (M) 101, a zoom drive gear train 102, a lens frame drive gear train 103, and a finder drive mechanism to be described later. The zoom lens barrel 104 includes a variable power photographing optical system (zoom photographing optical system); the finder optical system 110 includes a finder variable power system 107 that is in association with the zoom lens barrel 104; the drive motor (M) 101 acts as a drive source for feeding a film and driving the photographing and finder optical system; the zoom drive gear train 102 reduces the rotation speed of the drive motor 101; and the lens frame drive gear train 103 acts as a first driving force transmission means that is driven through a zoom drive gear train and transmits driving force to the zoom lens barrel 104.

The finder drive mechanism acts as a second driving force transmission means that is driven through the zoom drive gear train 102 and is composed of a zoom finder drive unit 105 and a finder cam (hereinafter, referred to simply as "F-cam") mechanism 23. The zoom finder drive unit 105 is composed of a finder drive gear train 21 and a friction clutch mechanism (friction clutch means) 22, and the F-cam mechanism 23 is driven by the zoom finder drive unit 105 and drives the finder variable power system 107 forward and backward.

The friction clutch mechanism 22 is an automatic adjustment mechanism which causes the zooming state of the zoom lens barrel 104 to be in agreement with the zooming state of the finder optical system 110 between a wide-angle end and a telephoto end in an assembly process and the like. Further, the F-cam mechanism 23 permits an F-cam assembly, which drives the finder variable power system 107 forward and backward, to rotate a predetermined angle of at least one rotation.

The zoom lens barrel 104 includes a lens frame 122 that holds a photographing lens 123 and the like constituting the zoom photographing optical system and that can be moved forward and backward and a rotational drive ring 121 that is driven by the lens frame drive gear train 103 and drives the lens frame 122 forward and backward.

Figure 3:
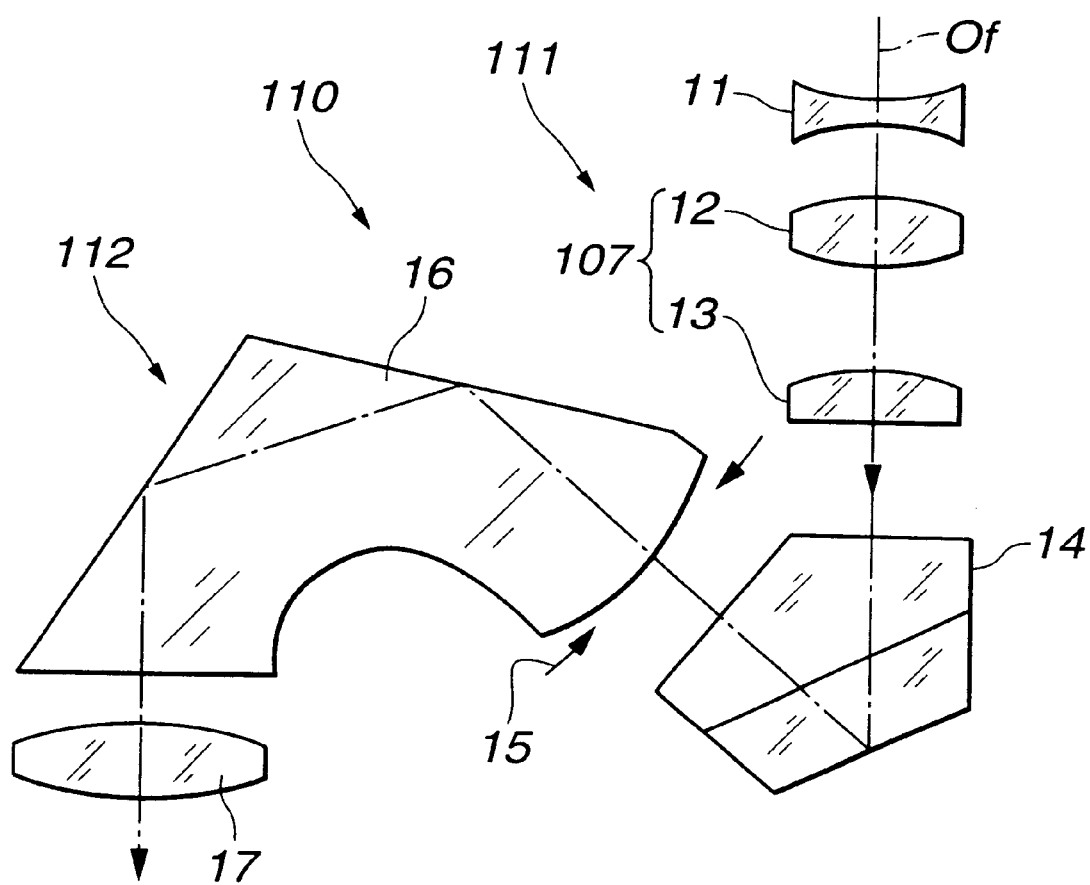
FIG. 3 is a view showing how a finder optical system of the camera of the embodiment of FIG. 1 is disposed.

The finder optical system 110 is composed of an objective optical system 111 and an eyepiece optical system 112. The objective optical system 111 receives light beams from a subject as shown in FIG. 3 which shows how the finder optical system is disposed and forms an observing image; and the eyepiece optical system 112 converts the observing image formed by the objective optical system 111 into a correct image and forms an enlarged image suitable for observing the correct image.

The objective optical system 111 is disposed along a finder optical axis Of and is composed of an objective lens 11, variable power lenses 12 and 13, and a first prism 14. The objective lens 11 is fixed to a finder main body 1 (hereinafter, referred to simply as "F-main body", see FIG. 4), the variable power lenses 12 and 13 constitute the finder variable power system 107; and the first prism 14 constitutes a part of a reversing optical system.

The eyepiece optical system 112 is fixed to the finder main body 1 and is composed of a finder field of view frame 15 disposed at a position where the observing image is formed, a second prism 16 constituting the other part of the reversing optical system, and an eyepiece lens 17.

The finder drive gear train 21 is composed of screw gears 32 and 33, spur gears 34 and 41, and the like and drives the friction clutch mechanism 22.

The F-cam mechanism 23 includes the F-cam assembly, can rotate the predetermined angle of at least one rotation through the friction clutch mechanism 22 and drives the variable power lenses 12 and 13 constituting the finder variable power system 107 by the rotation thereof.

The finder optical system and the finder drive mechanism will further be described in detail using FIGS. 4 to 9. Note that, in the following description, the rotating direction of the F-cam mechanism 23 is shown by rotating directions viewed from a drive side and an opposite side (a rotation regulating plate 49 side), and the clockwise rotational direction thereof is shown by a D1 direction and the counterclockwise rotational direction thereof is shown by a D2 direction.

Figure 4:
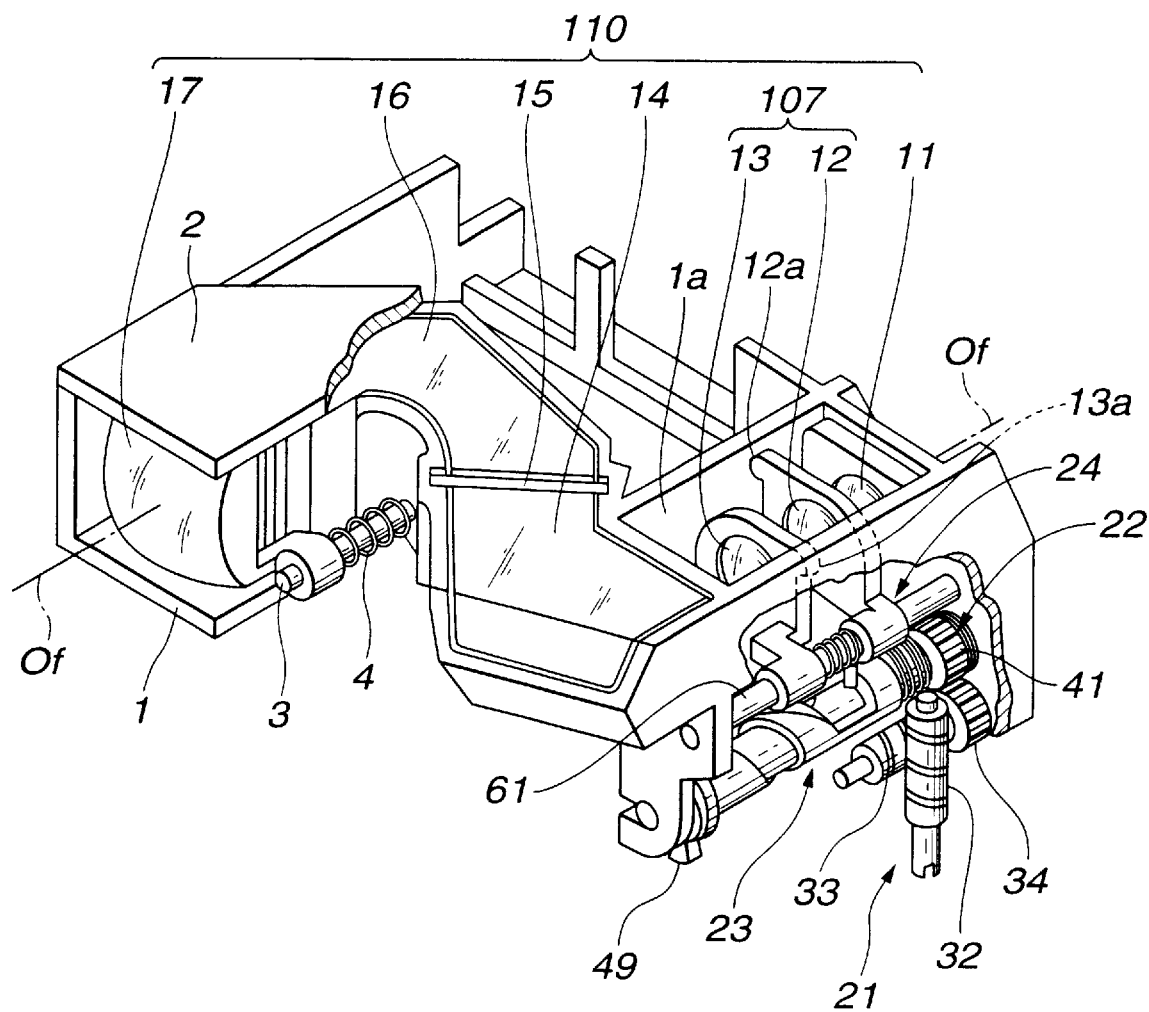
FIG. 4 is a perspective view of the finder unit including the finder optical system and the finder drive mechanism of the camera of the embodiment of FIG. 1.
Figure 5:
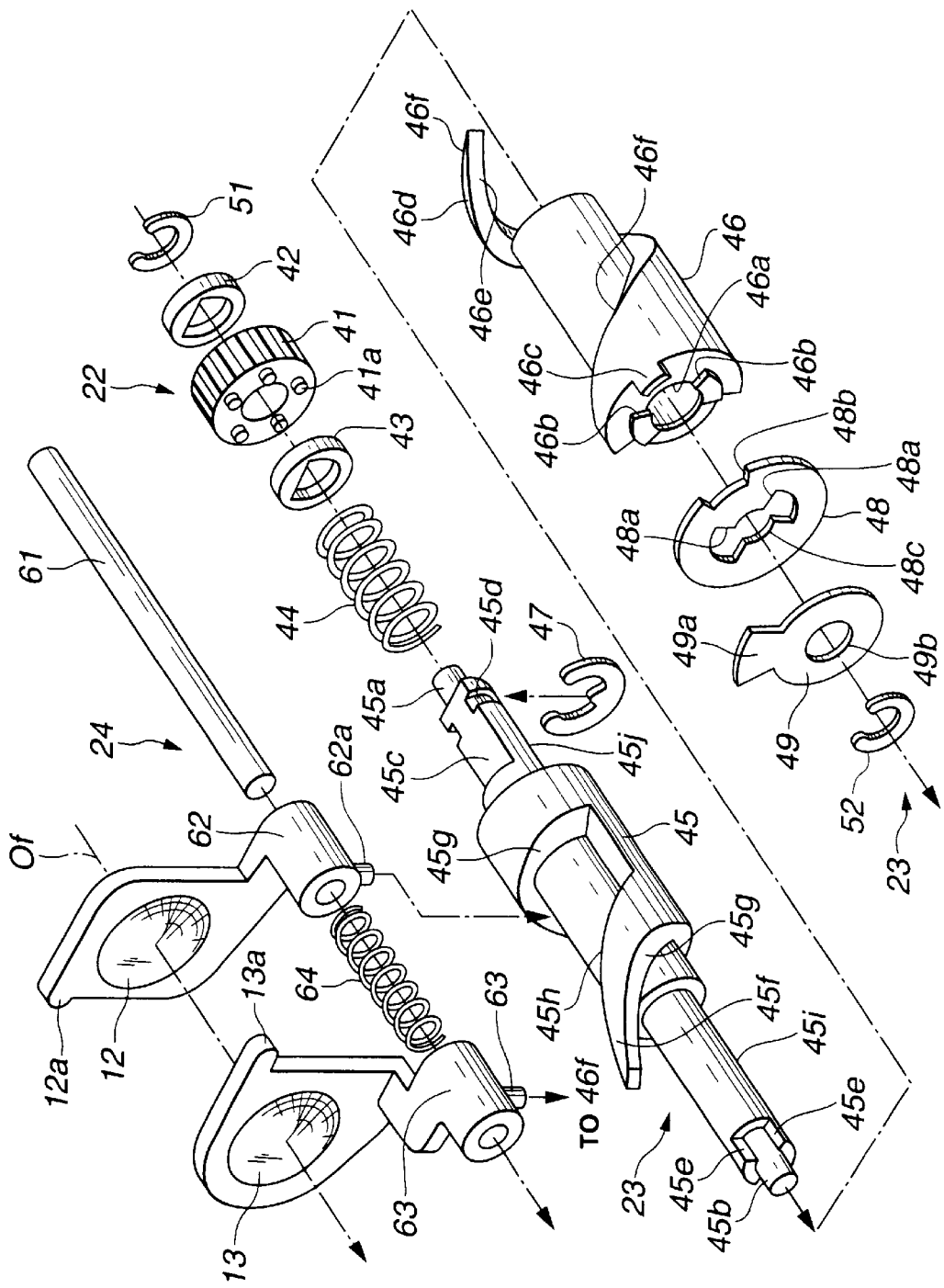
FIG. 5 is an exploded perspective view of the finder drive mechanism of the camera of the embodiment of the of FIG. 1.
Figure 6:
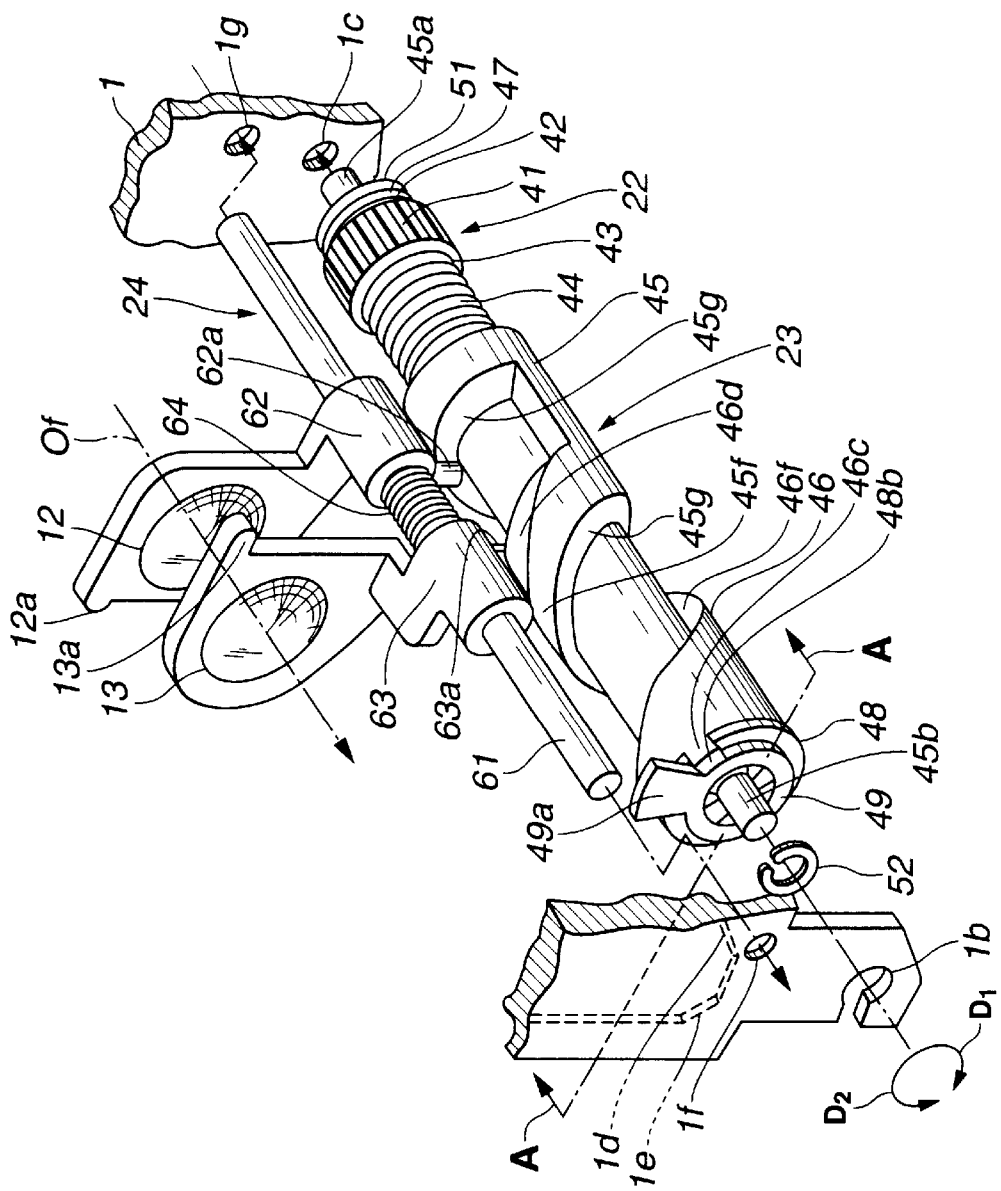
FIG. 6 is a perspective view of the finder drive mechanism of the camera of the embodiment of the of FIG. 1 when it is assembled.
Figure 7:
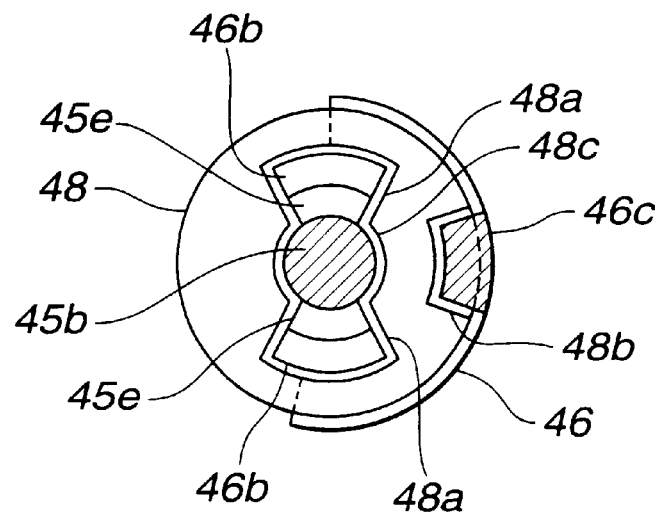
FIG. 7 is a sectional view taken along the line A—A of FIG. 6 and shows a state in which a rotation regulating plate is removed.
Figure 8:
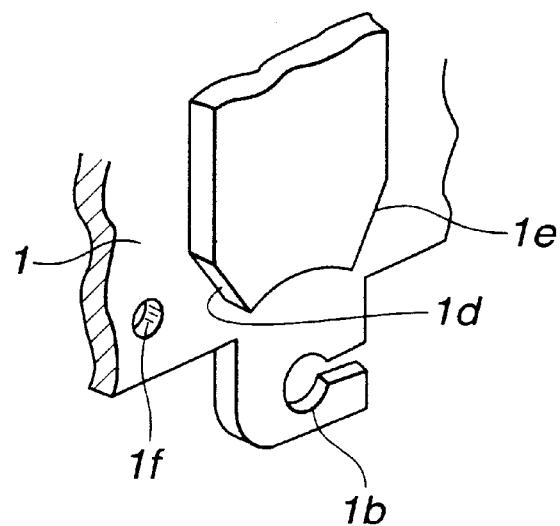
FIG. 8 is a perspective view of the vicinity of the rotation locking unit of a finder main body in the finder drive mechanism of the camera of the embodiment of the of FIG. 1.
Figure 9A:
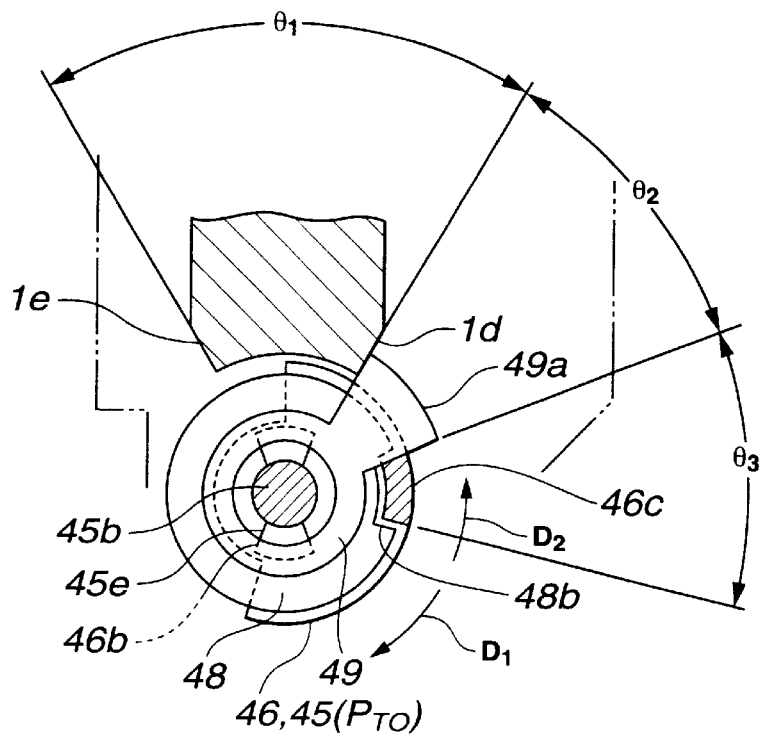
FIG. 9A is a sectional view taken along the line A—A of FIG. 6 and shows a state in which the rotation of an F-cam assembly in a D2 direction is regulated (locked) in the rotating states of an F cam mechanism in the finder drive mechanism of the camera of the embodiment of FIG. 1.
Figure 9B:
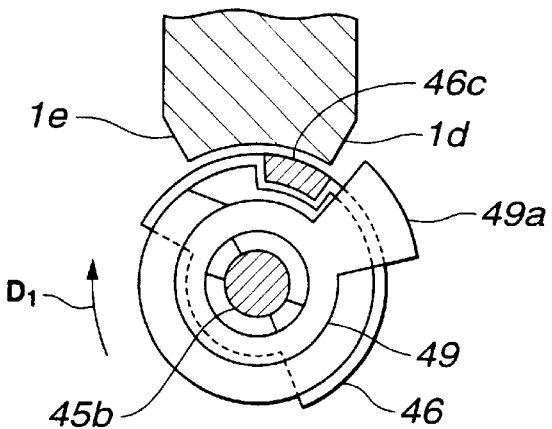
FIG. 9B is a sectional view taken along the line A—A of FIG. 6 and shows a state in which the F-cam assembly is switched from an independently-rotating-state to an integrally-engaged-rotating-state in the rotating states of the F cam mechanism in the finder drive mechanism of the camera of the embodiment of FIG. 1.
Figure 9C:
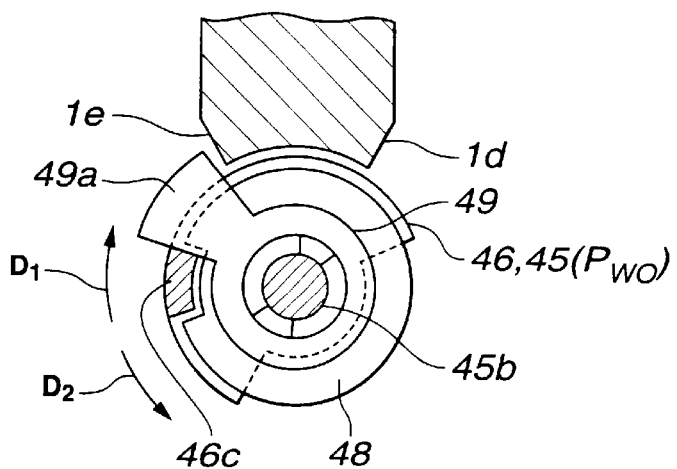
FIG. 9C is a sectional view taken along the line A—A of FIG. 6 and shows a state in which the rotation of the F cam nitrogen in a D1 direction is regulated (locked) in the rotating states of the F cam mechanism in the finder drive mechanism of the camera of the embodiment of FIG. 1.

FIG. 4 is a perspective view of the finder unit including the finder optical system and the finder drive mechanism, and FIG. 5 is an exploded perspective view of the finder drive mechanism. FIG. 6 is a perspective view of the finder drive mechanism when it is assembled. Further, FIG. 7 is a sectional view taken along the line A—A of FIG. 6 in which the rotation regulating plate 49 is removed and shows a state in which the end surfaces of the first and second F-cam members 45 and 46 are coupled with each other through a receiving plate. FIG. 8 is a perspective view of the vicinity of the rotation locking unit of a finder main body in the finder drive mechanism. FIGS. 9A and 9B are views showing rotating states of the F-cam assembly by the A—A cross section of FIG. 6, wherein FIG. 9A shows a state in which the rotation of the F-cam assembly in the D2 direction is regulated (locked), and FIG. 9B shows a state in which the F-cam assembly is switched from an independently-rotating-state to an integrally-engaged-rotating-state. Further, FIG. 9C shows a state in which the rotation of the F-cam assembly in the D1 direction is regulated (locked).

As shown in FIG. 4, the respective optical members of the finder optical system 110 are disposed to the upper portion of the finder main body 1, and the finder drive mechanism is disposed to the lower portion thereof.

The eyepiece lens 17 of the finder optical system 110 is slidably supported by the guide shaft 3 of the finder main body in a state in which it is urged by an urging spring 4 to adjust a diopter scale.

The variable power lenses 12 and 13 acting as the finder variable power system 107 are supported so as to move forward and backward along the finer optical axis Of. That is, the variable power lenses 12 and 13 are supported by a finder lens guide mechanism 24, which will be described.later, through a lower boss unit so as to be free to slide on a guide shaft 61 in a state in which projections 12a and 13a that are disposed on the sides of the variable power lenses 12 and 13 are in sliding contact with both the guide wall surfaces la of the finder main body. However, the guide shaft 61 is fixed to and supported by the finder main body 1.

The finder drive mechanism is composed of the finder drive gear train 21 and the friction clutch mechanism 22, which act as a zoom finder drive unit, and the F-cam mechanism 23.

The rotation of the zoom drive gear train 102 is transmitted to the lens barrel and at the same time also to the spur gear 34 through the screw gears 32 and 33 that constitute the finder drive gear train 21. The rotation of the spur gear 34 is transmitted to the spur gear 41, which is meshed therewith, of the friction clutch mechanism 22.

The F-cam mechanism 23 is driven by the friction clutch mechanism 22 that is driven through the spur gear 41, thereby driving the variable power lenses 12 and 13 forward and backward that are slidably supported by the finder lens guide mechanism 24. While a finder field angle is changed by the forward and backward movement of the variable power lenses 12 and 13, the variable power ratio thereof corresponds to the change of the focal length of the zoom lens barrel 104 that is driven in association with the variable power lenses 12 and 13.

The friction clutch mechanism 22 is sequentially fitted on the D-cut shaft 45j of the first F-cam member 45, which will be described later, of the F-cam mechanism 23. The friction clutch mechanism 22 is composed of a clutch spring 44, a clutch plate 43, the spur gear 41, a clutch plate 42, and an E-type stop ring 47. The clutch spring 44 is composed of a compressed spring; the clutch plate 43 has a D-shaped hole and is unrotatably fitted on the D-cut shaft 45j; the spur gear 41 is rotatably fitted on the D-cut shaft 45j; the clutch plate 42 has a D-shaped hole and is unrotatably fitted on the D-cut shaft 45j; and the E-type stop ring 47 is inserted into the stop ring groove 45d of the D-cut shaft 45j.

Note that the E-type stop ring 47 is held in a state in which the clutch plates 42 and 43 are abutted against the spur gear 41 with the clutch spring 44 compressed in a predetermined amount. The D-cut shaft 45j has a D-cut surface 45c that is formed by cutting the cylindrical surface of the D-cut shaft 45j by a plane having a width smaller than the diameter thereof. The D-shaped holes of the clutch plates 42 and 43 are holes into which the D-cut shaft 45j having the D-cut surface 45c can be inserted. The spur gear 41 has a plurality of projections 41a that are formed on both the sides thereof and slide in abutment against the clutch plates 42 and 43.

In the friction clutch mechanism 22, the spur gear 41 is clamped between the clutch plates 42 and 43 through the projections 41a with the urging force of the clutch spring 44 acting on the clutch plates 42 and 43, whereby the spur gear 41 is held with a predetermined friction force acting thereon. The rotation of the spur gear 41 is transmitted to the clutch plates 42 and 43 by the friction force and further transmitted to the first F-cam member 45 to be described later through the D-cut shaft 45j.

Accordingly, the drive of the spur gear 41 in both the rotational directions is ordinarily transmitted to the F-cam mechanism 23 through the clutch plates 42 and 43 of the friction clutch mechanism 22, and the variable power lenses 12 and 13 of the finder optical system are moved forward and backward by the rotation of the spur gear 41. However, when the F-cam mechanism 23 is rotated by the angle of the predetermined operation range (at least one rotation) and the rotation thereof is regulated by a stopper means to be described later or when abnormal load torque acts on the finder lens guide mechanism 24 and the F-cam mechanism 23, the spur gear 41 slips between and the clutch plates 42 and 43, whereby the F-cam mechanism 23 is stopped and no driving force is transmitted to the variable power lenses 12 and 13. In this state, only the spur gear 41 rotates idly. The spur gear 41 rotating idly can adjust the offset of the zoom positions between the finder variable power system 107, which will be described later, and the zoom photographing optical system of the zoom lens barrel 104.

The F-cam mechanism 23 includes the first F-cam (finder cam) member 45, the second F-cam member 46, the receiving plate 48, the rotation regulating plate 49 acting as a rotation regulating member (stopper means), and gap adjusting C rings 51 and 52.

Disposed to the first F-cam member 45 are support shafts 45a and 45b acting as rotating shafts and provided integrally with both the ends thereof, a first F-cam section at the center thereof, the D-cut shaft 45j interposed between the support shaft 45a and the first F-cam section, a passing-through shaft 45i interposed between the support shaft 45b and the first F-cam section, and a phase determining cutout 45e on the passing-through shaft 45i.

The first F-cam section includes a first F-cam surface 45g forming a cylindrical can surface, a joint surface 45h facing the first F-cam surface 45g, and a projection 45f to which the first F-cam surface 45g and the joint surface 45h are partly disposed. The first F-cam surface 45g is formed over the angle of a predetermined operation range of 360° or larger and provides the variable power lens 12 with a position between a telephoto end position and a wide-angle end position.

Disposed to the second F-cam member 46 are a passing-through shaft hole 46a through which the passing-through shaft 45i can pass, a second F-cam section, a phase determining projection 46b disposed on an end surface of the second F-cam section, and an F-cam projection 46C that acts as an abutment unit (stopper means) and projects in an axial direction.

The second F-cam section includes a second F-cam surface 46f that forms a cylindrical cam surface, a joint surface 46e facing the second F-cam surface 46f, and a projection 46d to which the second F-cam surface 46f and the joint surface 46e are partly disposed. The second F-cam surface 46f is formed over the angle of a predetermined operation range of 360° or larger and provides the variable power lens 13 with the telephoto end position and the wide-angle end position.

The receiving plate 48 is formed of a plate-shaped member and has a shaft hole 48c and fitting holes 48a that are formed at the center thereof, and an cutout 48b formed on the outer periphery thereof. The support shaft 45b of the first F-cam member 45 is precisely fitted into the shaft hole 48c; the phase determining cutout 45e of the first F-cam member 45 and the phase determining projection 46b of the second F-cam member 46 are precisely fitted into the fitting holes 48a; and the F-cam projection 46c of the second F-cam member 46 is inserted into the cutout 48b. Note that the term "precisely fitted" used above means that fitting is executed without a gap or with a very small amount of a gap. Further, the term "precisely fitted" used in the following description also means a similar state.

The rotation regulating plate 49 is formed of a plate-shaped member and has a shaft hole 49b formed at the center thereof and a fan-shaped projection 49a extending externally for regulating a rotational position. The passing-through shaft 45i of the first F-cam member 45 is precisely fitted into the shaft hole 49b.

The F-cam mechanism 23 and the friction clutch mechanism 22 are assembled to the finder main body 1 in such a manner that, first, the friction clutch mechanism 22 such as the spur gear 41 and the like is fitted on the D-cut shaft 45j of the first F-cam member 45 in a state in which the axial movement of the friction clutch mechanism 22 is regulated by the E-type stop ring 47 and the urging force of the clutch spring 44 is applied thereto. Then, the passing-through shaft hole 46a of the second F-cam member 46 is fitted on the passing-through shaft 45i of the first F-cam member 45 so as to joint the joint surface 45h of the first F-cam member 45 to the joint surface 46e of the second F-cam member 46.

Next, the receiving plate 48 is attached to an end of the F-cam assembly. That is, as shown in FIG. 7, the shaft hole 48c and the fitting holes 48a of the receiving plate 48 are precisely fitted over the support shaft 45b and the phase determining cutout 45e of the first F-cam member 45 and on the phase determining projection 46b of the second F-cam member 46, and at the same time the F-cam projection 46c of the second F-cam member 46 is inserted into the cutout 48b formed on the outer periphery of the receiving plate 48.

In the above mounted state, the first F-cam member 45 is integrated with the second F-cam member 46 with the joint surface 45h of the former member jointed to the joint surface 46e of the latter member, and two F-cam surfaces in which the first F-cam surface 45g faces the second F-cam surface 46f are formed.

Further, the shaft hole 49b of the rotation regulating plate 49 is fitted on the extreme end of the passing-through shaft 45i of the first F-cam member 45 so as to mount the rotation regulating plate 49 on the outside of the receiving plate 48.

The rotation regulating plate 49 is rotatably supported at the extreme end of the passing-through shaft 45i, and the projection 49a of the rotation regulating plate 49 can be abutted against the F-cam projection 46c of the F-cam member 46.

The C rings 51 and 52 each having a proper thickness are selected and mounted under pressure on the support shafts 45a and 45b each of which is at the respective end of the assembled first F-cam member 45 assembled as described above. When the F-cam assembly is mounted on the finder main body 1, the gap of the F-cam assembly in the axial direction and the position thereof in an optical axis direction are minutely adjusted by the thicknesses of the C rings 51 and 52.

In the F-cam mechanism 23 arranged as described above, the support shafts 45a and 45b on which the C rings 51 and 52 are mounted are inserted into the shaft receiving hole 1c of the finder main body 1 and then inserted into shaft receiving cutouts 1b from a side as shown in FIG. 6, whereby the first and second F-cam members 45 and 46 of the F-cam mechanism 23 are rotatably supported by the finder main body 1 in parallel to the finer optical axis Of.

As shown in FIGS. 8, 9A and the like, locking projections 1d and 1e each composed of a slanting surface and acting as a rotation locking member (stopper means) are disposed above each of the shaft receiving cutouts 1b of the finder main body 1 on which the F-cam mechanism 23 is mounted.

Note that the stopper means is used to regulate the rotation angles of the first and second F-cam members 45 and 46 to the predetermined angle of at least one rotation angle.

The locking projections 1d and 1e are located in the locus of rotation of the rotation regulating projection 49a, which acts as the stopper means, of the rotation regulating plate 49. That is, when the rotation regulating plate 49 is rotated in the D2 direction, it is abutted against the locking projection 1d, whereas when the rotation regulating plate 49 is rotated in the D1 direction, it is abutted against the locking projection 1e. Note that the F-cam projection 46c, which acts as the stopper means, of the second F-cam member 46 does not come into contact with the locking projections 1d and 1e.

While the rotation angle of the F-cam assembly of the F-cam mechanism 23 is regulated to the predetermined angle of at least one rotation angle by the rotation regulating action of the locking projections 1d and 1e, the rotation regulating plate 49, and the F-cam projection 46c. The rotation regulating action thereof will be explained later with reference to FIG. 9A and the like.

The finder lens guide mechanism 24 is composed of the guide shaft 61 and a compressed urging spring 64. Boss units 62 and 63 that are formed integrally with the variable power lenses 12 and 13 are slidably fitted on the guide shaft 61; and the urging spring 64 is interposed between the boss units 62 and 63 and urging them in a separating direction. Note that the guide shaft 61 is inserted into the support shaft holes 1f and 1g of the finder main body 1 and supported in parallel to the finer optical axis of.

Cam followers 62a and 63a are disposed to the boss units 62 and 63 and urged against the first and second F-cam surfaces 45g and 46f of the F-cam mechanism 2 by the urging spring 64 and slidably abutted thereagainst. Therefore, when the first and second F-cam members 45 and 46 of the F-cam mechanism 23 rotate, the variable power lens 12 moves along the first F-cam surface 45g and the variable power lens 13 moves along the second F-cam surface 46f so that they are driven forward and backward between the telephoto end and the wide-angle end.

How the rotation of the F-cam assembly of the F-cam mechanism 23 is regulated in the finder drive mechanism having the above arrangement will be explained with reference to FIGS. 9A, 9B, and 9C.

The rotation angles of the F-cam members 45 and 46 of the F-cam mechanism 23 are regulated to the predetermined rotation angle of at least one rotation angle by the locking projections 1d and 1e of the finder main body 1, and the stopper means such as the rotation regulating plate 49 and the like, and the following description will be made supposing that the F-cam assembly is in a telephoto state and the F-cam members 45 and 46 are rotated to the regulation limit position in the D2 direction. In this state, the F-cam projection 46c is abutted against the projection 49a of the rotation regulating plate 49 from the D2 direction, the projection 49a is abutted against and locked by the locking projection 1d of the finder main body 1, and the F-cam members 45 and 46 are located at a telephoto side rotation regulating position PT0 where the variable power lenses 12 and 13 are located at the telephoto end position.

To switch the state of FIG. 9A to a wide-angle end state, the F-cam members 45 and 46 are rotated in the D1 direction. This rotational operation causes the F-cam members 45 and 46 to be independently rotated in a state in which the F-cam projection 46c thereof is separated from the projection 49a of the rotation regulating plate 49.

Thereafter, as shown in FIG. 9B, the F-cam members 45 and 46 are rotated in a state in which they are engaged integrally with each other with the F-cam projection 46c thereof abutted against the opposite side of the projection 49a and pressing the projection 49a in the D1 direction.

After the state shown in FIG. 9B, the rotation angle of the F-cam members 45 and 46 exceeds the one rotation angle, and the F-cam members 45 and 46 stop in a state in which the F-cam projection 46c presses the projection 49a in the D1 direction and the projection 49a is engaged with the locking projection 1e from the D1 direction as shown in the locking state of FIG. 9C. The position where the rotation of the F-cam members 45 and 46 is stopped is a predetermined rotational position where they rotate more than the one rotation angle from the rotation regulating position PT0 in the D1 direction, that is, the position is a wide-angle side rotation regulating position PW0 for positioning the variable power lenses 12 and 13 at the wide-angle end position.

A rotational operation opposite to the above rotational operation will be executed to rotate the F-cam members 45 and 46 of FIG. 9C from the wide-angle side rotation regulating position PW0 to the rotation regulating position PT0.

Note that the rotation angle of the F-cam members 45 and 46 in the operation range thereof from the wide-angle side rotation regulating position PW0 to the rotation regulating position PT0 corresponds to the zoom rotation angle of the zoom lens barrel 104 from the wide-angle end to the telephoto end. That is, when the zoom lens barrel 104 is driven from the wide-angle end to the telephoto end by the drive motor 101 through the zoom drive gear train 102 and the lens frame drive gear train 103, the F-cam members 45 and 46 are driven from the rotation regulating position PW0 to the rotation regulating position PT0.

The rotation angle of the predetermined operation range regulated to the F-cam members 45 and 46 (the rotation angle from the rotation regulating position PW0 to the rotation regulating position PT0) is determined by the shapes of the locking projections 1d and 1e, the projection 49a of the rotation regulating plate 49 and the F-cam projection 46c in the rotational direction thereof. That is, the regulated rotation angle $\theta 0$ of the F-cam members 45 and 46 is represented by the following formula $$\theta 0 = 720° - (\theta 1 + 2\theta 2 + \theta 3) \quad (1)$$

where, $\theta 1$ represents the opening angle of the locking projections 1d and 1e, $\theta 2$ represents the opening angle of the projection 49a of the rotation regulating plate, and $\theta 3$ represents the opening angle of the F-cam projection 46c as the opening angles in a rotational direction about the support shaft 45b.

When the value of $(\theta 1+2\theta 2+\theta 3)$ is equal to or less than 360°, the regulated rotation angle $\theta 0$ is inevitably set from 360° or more to 720° or less. That is, any arbitrary regulated rotation angle of the F-cam assembly from 360° to about 720° can be obtained by properly setting the value of $(\theta 1+2\theta 2+\theta 3)$. However, since the value of $(\theta 1+2\theta 2+\theta 3)$ cannot be set to 0°, the upper limit rotation angle does not reach 720°.

It should be noted that, in the operating states before and after the state shown in FIG. 9B excluding the locked state shown in FIGS. 9A and 9C, the F-cam members 45 and 46 do not always move in the aforementioned separated state or integrally engaged state because the rotation regulating plate 49 is rotatably supported in a free state in the relationship between the F-cam projection 46c and the projection 49a of the rotation regulating plate 49.

Next, the action of the friction clutch mechanism 22 will be described in more detail with reference to FIGS. 5, 6 and the like.

When the spur gear 41 is rotated through the finder drive gear train 21, the rotational torque of the spur gear 41 is transmitted to the clutch plates 42 and 43 by frictional force because they are pressed against the spur gear 41 by the clutch spring 44. At this time, since the rotation of the clutch plates 43 and 42 is regulated with respect to the D-cut shaft 45j of the F-cam members 45 and 46, when the clutch plates 42 and 43 rotate, the F-cam members 45 and 46 are rotated integrally therewith.

However, since the driving force of the spur gear 41 is transmitted to the clutch plates 42 and 43 by the frictional force, when the rotational torque of the F-cam members 45 and 46 is larger than predetermined torque or when the rotation of the F-cam members 45 and 46 is regulated by the stopper means of the aforementioned F-cam mechanism 23, the spur gear 41 slips between the clutch plates 42 and 43 and only the spur gear 41 rotates.

Drive torque TD for driving the variable power lenses 12 and 13 of the finder variable power system 107 approximately in the optical axis direction (hereinafter, referred to as "finder drive torque") is necessary as the rotational torque of the F-cam members 45 and 46. This drive torque TD is determined by the urging force of the urging spring 64, the lead angles of the cam surfaces 45g and 46f, and the frictional resistances between the cam followers 62a and 63a and the F-cam surfaces 45g and 46f.

Torque TS with which the spur gear 41 begins to slip between the clutch plates 42 and 43 (hereinafter, referred to as "slip torque") is set sufficiently larger than the finder drive torque TD.

The slip torque TS is determined by the following formula $$TS = 2R\mu F \quad (2)$$

where, F represents the force of the clutch spring 44, $\mu$ represents the coefficient of friction between the clutch plates 42 and 43 and spur gear 41, and R represents the positions of the projections 41a of the spur gear 41 when the spur gear 41 is in contact with the clutch plates 42 and 43, that is, the distance from the center of rotation of the spur gear 41.

The materials of the spur gear 41 and the clutch plates 42 and 43, the force of the clutch spring 44 and the positions of the projections 41a are determined based on the formula (2) so that the stop torque TS is larger than the finder drive torque TD.

As described above, the stop torque TS is set to satisfy the following formula (3).

$$\text{stop torque } TS > \text{finder drive torque } TD \quad (3)$$

Accordingly, when the rotation of the F-cam members 45 and 46 is not regulated, the rotational force of the spur gear 41 is transmitted to the F-cam members 45 and 46 so that the variable power lenses 12 and 13 can be moved forward and backward and the field angle of the finder optical system 110 can be changed according to the change of the focal length of the zoom photographing optical system.

In contrast, even if the spur gear 41 is driven to rotate the F-cam members 45 and 46 in the D2 direction or the D1 direction as shown in FIG. 9 in a state in which the rotation of the F-cam members 45 and 46 is regulated by the stopper means such as the locking projections 1d and 1e, the rotation regulating plate 49 and the like described above, the F-cam members 45 and 46 are not rotated and only the spur gear 41 rotates because it slips between the clutch plates 42 and 43. As a result, the finder optical system 110 is maintained in the telephoto state or a wide-angle state in the above rotation regulated state.

Note that it is necessary to set the stop torque TS smaller than the drive torque transmitted through the finder drive gear train 21 simultaneously with the satisfaction of the condition shown by the formula (3) to obtain the idling state of the spur gear 41.

Next, an operation for adjusting the offset between the zoom position of the finder optical system and that of the zoom lens barrel which may arise in the assembly process and the like will be described.

When the F-cam members 45 and 46 are located at the terminal end position PT0 or PW0 (FIGS. 9A and 9B) where the rotation thereof is regulated as described above, the finder variable power system 107 of the finder optical system 110 is set at the position of the telephoto state or the wide-angle state, respectively. Therefore, when offset is caused in the relationship between the field angle of the finder optical system 110 and the focal length of the zoom photographing optical system of the zoom lens barrel 104 in the assembly process and the like, the friction clutch mechanism 22 is idly driven in a state in which the rotation of the F-cam members 45 and 46 are regulated by the stopper means of the F-cam assembly provided with the aforementioned F-cam mechanism 23 by zooming the photographic optical system to the telephoto end or the wide angle end. The idling drive of the friction clutch mechanism 22 causes the offset of the position where the spur gear 41 is jointed to the clutch plates 42 and 43, whereby the zooming state of the finder optical system 110 can be automatically agreeing with the zooming state of the zoom lens barrel 104.

When, for example, the finder variable power system 107 is offset more to the telephoto side than to the zoom photographing optical system of the zoom lens barrel 104, first, the zoom photographing optical system of the zoom lens barrel 104 is driven in a telephoto direction. While the zoom photographing optical system is driven, the F-cam projection 46c is rotated in the D2 direction and abutted against the rotation regulating projection 49a of the rotation regulating plate 49, further the rotation regulating projection 49a is abutted against the locking projection 1d, and the F-cam members 45 and 46 reach the telephoto side rotation regulating position PT0 and stop thereat as shown in FIG. 9. Thereafter, when the zoom lens barrel 104 is driven to the telephoto end position, the zoom position alignment is finished.

When the finder variable power system 107 is offset more to the wide-angle side than to the zoom photographing optical system of the zoom lens barrel 104 on the contrary, the zoom photographing optical system of the zoom lens barrel 104 is driven in a wide-angle direction contrary to the aforementioned adjustment operation. While the zoom photographing optical system is driven, the F-cam projection 46c is rotated in the D1 direction and abutted against the rotation regulating projection 49a of the rotation regulating plate 49, further the rotation regulating projection 49a is abutted against the locking projection 1e, and the F-cam members 45 and 46 reach the wide-angle side rotation regulating position PW0 and stop thereat as shown in FIG. 9C. Thereafter, when the zoom lens barrel 104 is driven to the wide-angle end position, the zoom position alignment is finished.

Note that when it is unknown whether the finder variable power system 107 is located on any one of the telephoto side and the wide-angle side with respect to the zoom photographing optical system of the zoom lens barrel 104, the zoom position alignment can be carried out by the execution of the aforementioned two types of the adjustment operations. Further, when a user causes the gears of the lens frame drive system to be out of mesh by a malfunction or the like in an operation other than assembly and the zoom position of the lens barrel is offset from that of the finder optical system, an original zoom position can be restored by adjusting an offset zoom position as described above.

In the camera of this embodiment, when the drive motor (M) 101 of FIG. 2 is driven in a predetermined direction in the offset zoom position adjusted state described above, the lens frame 122 of the zoom lens barrel 104 is driven forward and backward through the zoom drive gear train 102, whereby zooming-up or zooming-down is executed.

At the same time, the finder drive gear train 21 is driven in association with the zoom lens barrel 104 that is driven for zooming, and the rotation of the finder drive gear train 21 is transmitted from the friction clutch mechanism 22 to the F-cam members 45 and 46. Then, the variable power lenses 12 and 13 of the finder variable power system 107 are driven to a zoom-up position or a zoom-down position which corresponds to the zoom lens barrel 104 that is driven for zooming.

As described above, according to the camera to which the finder drive mechanism of this embodiment is applied, the provision of the friction clutch mechanism with the driving force transmitting unit for driving the finder optical system permits the zoom position of the finder variable power system 107 to be simply aligned with that of the zoom photographing optical system of the zoom lens barrel 104 after the camera is assembled, which eliminates the necessity of adjusting the position at which gears used in the driving system are meshed with each and of aligning lenses. Accordingly, the number of man-hours can be reduced in the assembly process and the occurrence of mistakes in the assembly process can be prevented. Further, cameras can be adjusted one by one, the lens barrel can more precisely be aligned with the finder optical system.

Further, when the lens barrel is offset from the finder optical system because the user causes the gears of the lens frame drive system to be out of mesh by a malfunction or the like, this offset can be simply corrected without disassembling mechanisms and the like as well as the deterioration of the function of them can be prevented.

Further, in the finder drive mechanism of this embodiment, the application of the F-cam mechanism 23 makes it possible to rotate the F-cam assembly by an angle in the predetermined operation range of at least one rotation angle. Therefore, it is easy to increase variable power as well as one of the regulations of optical design can be eliminated. At the same time, the variable power per unit rotation angle of the F-cam assembly or sensitiveness to the diopter scale can be suppressed to a low level by increasing the amount of rotation of the F-cam assembly, by which drive torque can be reduced and which is advantageous to the accuracy of parts.

Since the rotation regulating plate 49 is composed of a plate member is disposed in the space in the axial direction along the axis of the F-cam assembly as the arrangement for regulating the rotation of the F-cam assembly to an angle in the predetermined operation range of at least one rotation angle, this arrangement can be realized simply at a less expensive cost without occupying a large space.

Further, the F-cam assembly in this embodiment employs the structure divided into the two parts as the F-cam assembly, which makes it easy to manufacture the F-cam assembly having the rotation angle in operation of at least one rotation angle. In particular, the cost of parts can be reduced when the F-cam assembly is molded of resin.

Note that while the zoom lens barrel 104 of the camera, to which the finder drive mechanism of the aforementioned embodiment is applied, is driven for zooming from the wide-angle position to the telephoto position in association with the finder optical system 110, the present invention is by no means limited thereto and also is applicable to a lens barrel that can be driven from the telephoto position to a collapsed position by an independent motor. In this case, while the lens barrel is driven from the telephoto end to the collapsed position, the finder optical system also is driven forward and backward from a position corresponding to the telephoto end to a position corresponding to the collapsed position through the F-cam assembly in association with the movement of the lens barrel. Thus, the lens barrel and the finder are correctly set at the respective positions.

While the F-cam members 45 and 46 of the finder drive mechanism of this embodiment employ the structure divided into the two parts, they need not necessarily be divided into the two parts and may be arranged as an F-cam assembly of an integrated structure. In this case, the phase determining cutout 45e, the projection 46b and the receiving plate 48 are not necessary as a matter of course.

Further, while the offset between the lens frame and the finder is corrected in this embodiment, the present invention is by no means limited thereto and may be applied to an alignment structure for aligning the pop-up structure of an electronic flash and a lens frame.

As described above, according to the camera to which the finder drive mechanism of the present invention is applied, it is possible to regulate the rotation of the finder cam to an angle in the predetermined operation range of at least one rotation angle. Further, since the rotation of the finder cam can be set to the angle in the predetermined operation range of at least one rotation angle, variable power can be easily increased and one of the regulations of the optical design can be eliminated. At the same time, the variable power per unit rotation angle of the F-cam assembly or sensitiveness to the diopter scale can be suppressed to a low level by increasing the amount of rotation of the F-cam assembly, by which drive torque can be reduced and which is advantageous to the accuracy of parts.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A finder drive mechanism comprises:
   a finder cam assembly which has a rotating shaft and to which a cam is formed so as to drive a lens group in a finder optical system by rotation thereof;
   a rotation regulating member disposed around the rotating shaft of said finder cam assembly so as to be free to rotate in both directions;
   a rotation locking member disposed in a locus of rotation of said rotation regulating member for regulating a rotating range of said rotation regulating member to less than one rotation by being abutted against and locking said rotation regulating member; and
   an abutment section formed to said finder cam assembly and capable of being abutted against said rotation regulating member in a rotating direction thereof,
   wherein said finder cam assembly is operated in one of the following operating states according to the rotation thereof in both directions: an independently-rotating-state in which said abutment section is separated from said rotation regulating member and said finder cam assembly rotates independently; an integrally-engaged-rotating-state in which said abutment section is abutted against said rotation regulating member and rotates said rotation regulating member integrally with said finder cam assembly; and a locking state in which the rotation of said finder cam assembly is locked by locking the rotation of said rotation regulating member that is rotated in the integrally-engaged-rotating-state by said rotation locking member.

2. A finder drive mechanism according to claim 1, wherein said rotation regulating member is formed in a flat plate shape.

3. A finder drive mechanism according to claim 1, wherein when said finder cam assembly is driven about the rotating shaft in both directions, and the rotation range of said finder cam assembly which is determined by the respective locked states is regulated to at least one rotation.

4. A camera comprising:
   a variable power photographing lens barrel having a variable power photographing optical system;
   a drive source;
   first driving force transmission means for transmitting a driving force from said drive source to said variable power photographing lens barrel;
   a finder optical system having a variable power function according to said variable power photographing optical system;
   a finder cam assembly having a rotational operation range of at least one rotation about a rotating shaft for driving a variable power lens group of said finder optical system by being rotated;
   second driving force transmission means for transmitting the driving force from said drive source to said finder cam assembly of said finder optical system;
   friction clutch means disposed to said second driving force transmission means; and
   stopper means for regulating the rotational operation range of said finder cam assembly to a predetermined operation range of at least one rotation,
   wherein said stopper means comprises:
      a rotation regulating member disposed around the rotating shaft of said finder cam assembly so as to be free to rotate with respect to said finder cam assembly;
      an abutment section formed integrally with said finder cam assembly in a state in which it can be abutted against said rotation regulating member in a rotating direction; and
      a rotation locking member fixedly disposed in a locus of rotation of said rotation regulating member for regulating the rotation of said rotation regulating member to less than one rotation by being abutted against said rotation regulating member.

5. A camera comprising:
   a variable power photographing lens barrel having a variable power photographing optical system;
   a finder optical system having a variable power function for executing variable power operation according to said variable power photographing optical system;
   a finder cam assembly having an operation range of at least one rotation about a rotating shaft and engaged with a variable power lens group in said finder optical system by being rotated so as to drive said variable power lens group;
   a rotation regulating member disposed around the rotating shaft of said finder cam assembly so as to be free to rotate with respect to said finder cam assembly;

an abutment section disposed integrally with said finder cam assembly in a state in which it can be abutted against said rotation regulating member in a rotating direction; and a rotation locking member fixedly disposed in a locus of rotation of said rotation regulating member for regulating the rotation of said rotation regulating member to less than one rotation by being abutted against said rotation regulating member, whereby the operation range of said finder cam assembly is regulated to a predetermined operation range of at least one rotation.

6. A camera comprising:

a finder optical system having a lens group supported movably in an optical axis direction;

a finder cam assembly having an operation range of at least one rotation about a rotating shaft and engaged with said lens group of said finder optical system by being rotated so as to drive said lens group;

a rotation regulating plate disposed to said finder cam assembly so as to be free to rotate around the rotating shaft of said finder cam assembly;

an abutment section disposed integrally with said finder cam assembly so as to be abutted against said rotation regulating plate in a rotating direction; and a rotation locking member fixedly disposed in a locus of rotation of said rotation regulating plate for regulating the rotation of said rotation regulating plate to less than one rotation by being abutted against said rotation regulating plate, whereby the operation range of the rotating shaft of said finder cam assembly is regulated to a predetermined operation range of at least one rotation.

7. A camera according to claim 6, wherein the rotation of said finder cam assembly is regulated in a predetermined operation range of from at least one rotation to less than two rotations.

8. A camera according to claim 6, wherein the rotating shaft of said finder cam assembly is disposed approximately in parallel to a finder optical axis.

9. A camera according to claim 6, wherein:

said rotation regulating plate is a flat plate member that is engaged with and supported by said finder cam assembly in a state in which it can be rotated about the shaft of said finder cam assembly and has a projection projecting from a part of a periphery thereof in a radial direction;

said abutment section is a projection disposed on a part of the periphery of said finder cam assembly and said projection can be engaged with said rotation regulating plate in the rotating direction; and said rotation locking member has a fixed locking section that is abutted against said projection of said rotation regulating plate.

10. A camera according to claim 9, wherein said finder cam assembly can be rotated in both directions, and when said finder cam assembly is rotated in the respective directions, said projection of said rotation regulating plate is clamped in a rotating surface by said projection of said finder cam assembly and said fixed locking section of said rotation locking member so as to regulate the operation range of said finder cam assembly.

11. A camera according to claim 6, wherein said rotation regulating plate is disposed at an end of said finder cam assembly in an axial direction thereof.

12. A camera comprising:

a finder optical system having a lens group supported movably in an optical axis direction;

a finder cam assembly having an operation range of at least one rotation about a rotating shaft and engaged with said lens group in said finder optical system being rotated so as to drive said lens group; and stopper means for regulating the operation range of the rotating shaft of said finder cam assembly to a predetermined operation range of at least one rotation;

wherein said stopper means comprises:

a rotation regulating plate disposed around the rotating shaft of said finder cam assembly so as to be free to rotate with respect to said finder cam assembly and having a projection for regulating rotation;

a rotation locking member disposed in a locus of rotation of said projection of said rotation regulating plate and outside of a locus of rotation of said finder cam assembly for regulating the rotation of said rotation regulating plate to less than one rotation by being abutted against said projection; and an abutment section disposed integrally with said finder cam assembly in a state in which it can be abutted against said projection of said rotation regulating plate in a rotating direction.

13. A camera comprising:

a variable power photographing lens barrel having a focal length variable photographing optical system;

a finder optical system having a variable power function for executing variable power operation according to the variable power operation of said focal length variable photographing optical system;

a finder cam assembly having an operation range of at least one rotation about the rotating shaft thereof and engaged with a variable power lens group of said finder optical system by being rotated so as to drive said variable power lens group;

a rotation regulating plate disposed coaxially with the rotating shaft of said finder cam assembly so as to be freely movable;

an abutment section disposed integrally with said finder cam assembly in a state in which it can be abutted against said rotation regulating plate in a rotating direction; and a rotation locking member fixedly disposed in a locus of rotation of said rotation regulating plate for regulating the rotation of said rotation regulating plate to less than one rotation by being abutted against said rotation regulating plate, whereby the operation range of the rotating shaft of said finder cam assembly is regulated to a predetermined operation range of at least one rotation.

* * * * *